March 3, 1931. F. W. BARTH 1,794,435
APPARATUS AND METHOD FOR MAKING CORRUGATED SHEETS
Filed Sept. 20, 1929 4 Sheets-Sheet 1

INVENTOR
Fred W. Barth
BY
Edwards, Bower & Poot
ATTORNEYS

March 3, 1931.                F. W. BARTH                1,794,435
APPARATUS AND METHOD FOR MAKING CORRUGATED SHEETS
                  Filed Sept. 20, 1929        4 Sheets-Sheet 2
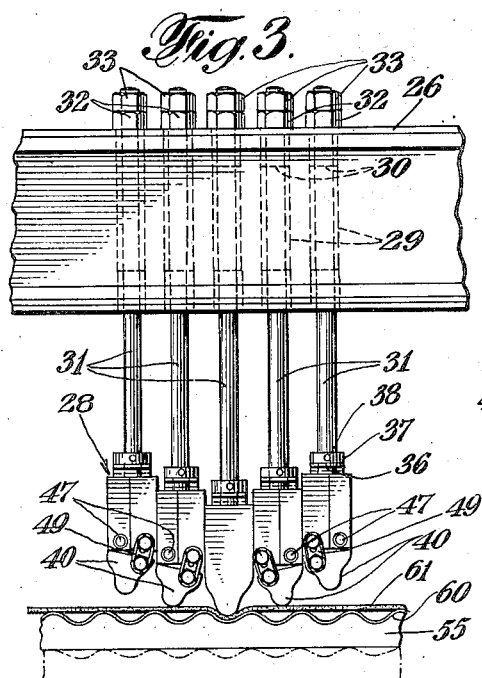
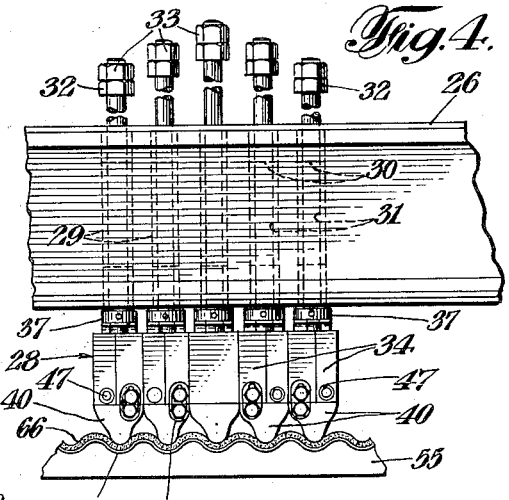
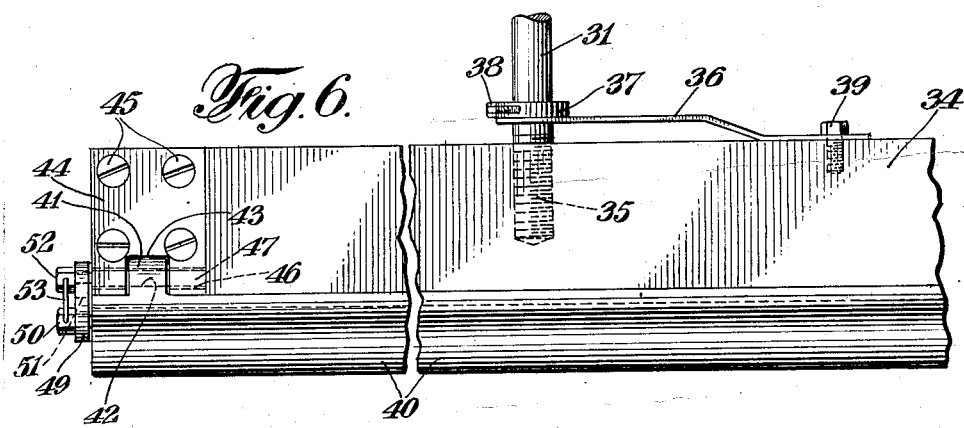
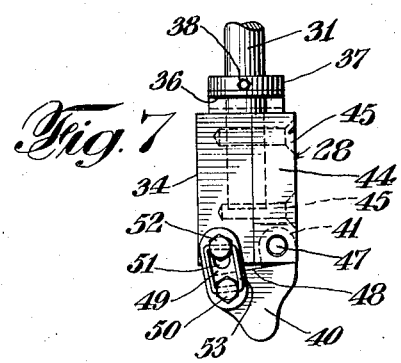
INVENTOR
Fred W. Barth
BY
Edwards, Bower Hool
ATTORNEYS

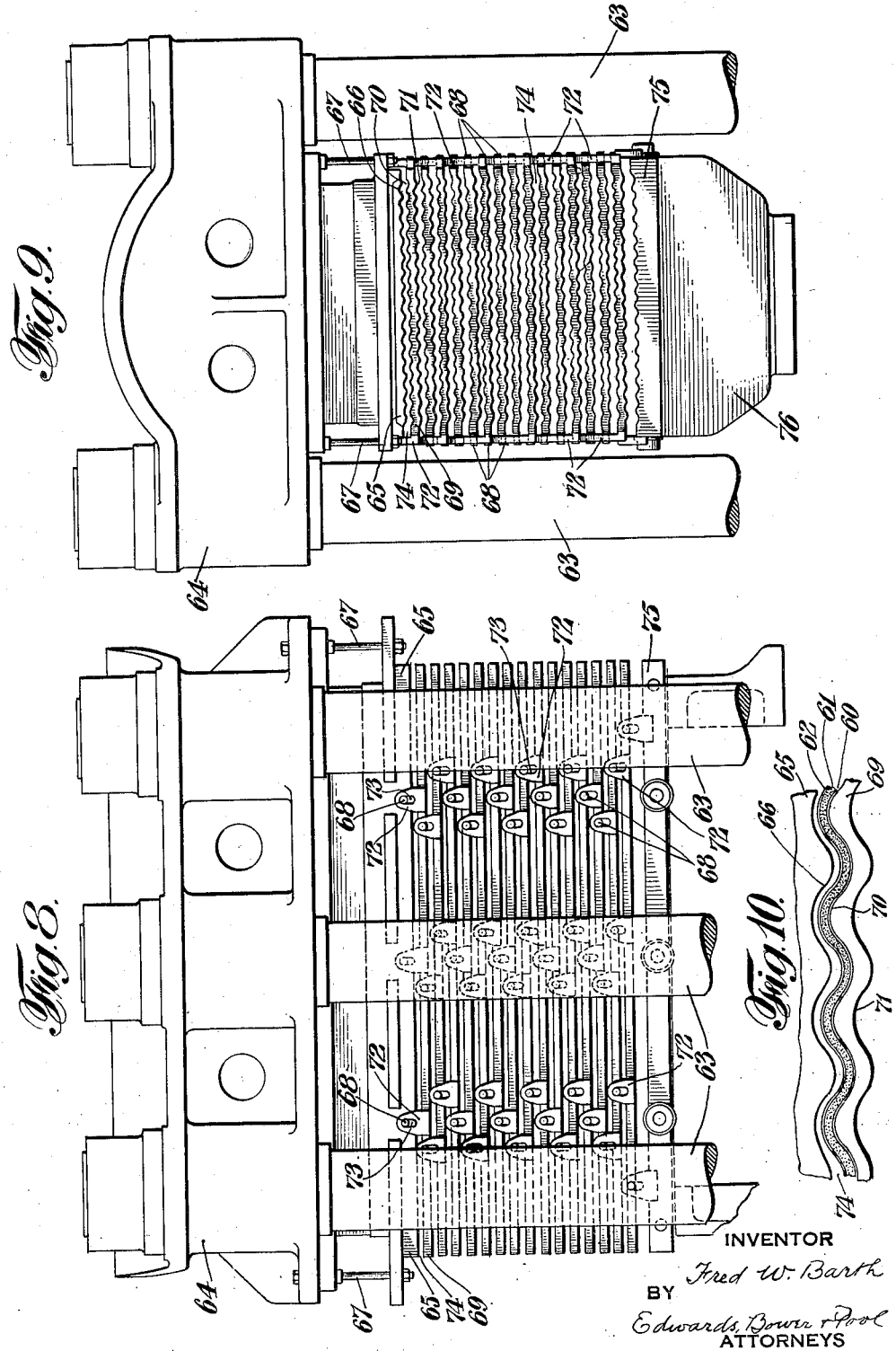

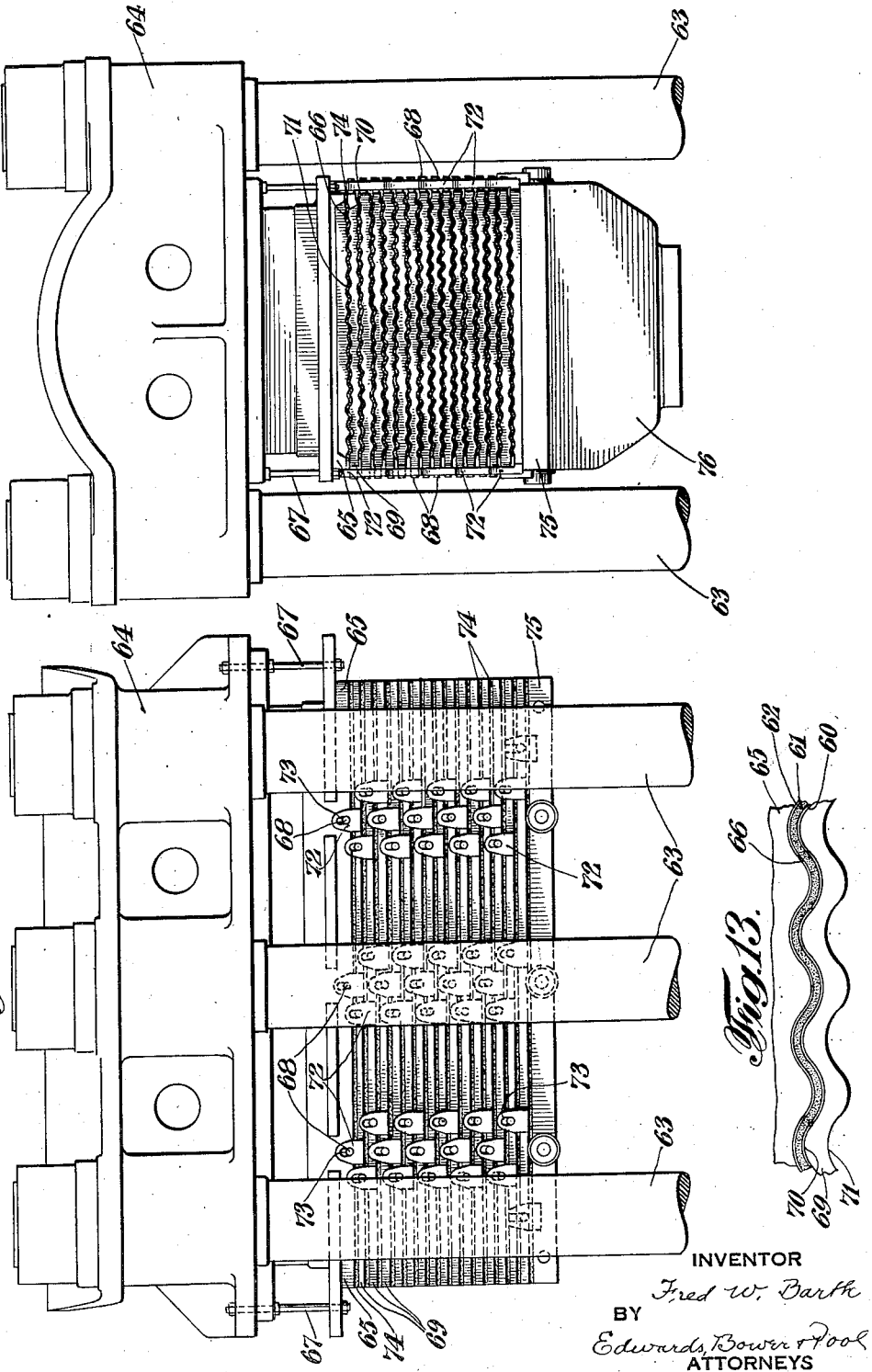

Patented Mar. 3, 1931

1,794,435

UNITED STATES PATENT OFFICE

FRED W. BARTH, OF LANSDALE, PENNSYLVANIA, ASSIGNOR TO AMBLER ASBESTOS SHINGLE & SHEATHING COMPANY, A CORPORATION OF PENNSYLVANIA

APPARATUS AND METHOD FOR MAKING CORRUGATED SHEETS

Application filed September 20, 1929. Serial No. 393,921.

My invention relates to the production of corrugated sheets from plastic material, and the form of the invention herein shown was particularly designed for the manufacture of corrugated sheet asbestos material.

The general object of the invention is to provide mechanism for producing corrugated sheets of plastic material, having regard to the liability of the material when in a more or less plastic condition to tear or become subjected to weakening strains which reduce its lasting qualities and tend also to lack of uniformity.

A further object of the invention is to provide improved means for compressing sheets so as to promote density and homogeneity.

Another object of the invention is to corrugate sheets one at a time by first forming a corrugation or crease at substantially the middle of the sheet and thereafter forming successively the corrugations in pairs at opposite sides of the middle by drawing inward the material from the sides as a whole and also drawing it from the outside inward into each of the corrugations.

Another object is to simultaneously compress a number of the corrugated sheets so as to obtain uniform compressive action in all of the sheets at the same time, thus conserving space and minimizing the necessary compressive effort.

To the above and other ends which will subsequently appear the present invention consists in the features of constructions, combinations of devices, and arrangements of parts hereinafter described and particularly pointed out in the claims.

One form of the invention, and that at present preferred by me, is illustrated in the accompanying drawing, wherein Fig. 1 is an end view of a machine for forming corrugations in a sheet of plastic material;

Fig. 3 is an enlarged end view showing a few of the forming devices just starting the forming operation;

Fig. 4 is a view similar to Fig. 3 with the forming devices just completing the forming operation;

Fig. 5 is an end view of a portion of one of the sheets of asbestos material with an upper and lower metal corrugated supporting plate;

Fig. 6 is an enlarged side view of one of the former blocks;

Fig. 7 is an end view of the former block shown in Fig. 6;

Fig. 8 is a side view of a multiple or gang pressing machine showing the dies in the open position;

Fig. 9 is an end view of the pressing machine shown in Fig. 8;

Fig. 10 is a fragmentary end view of one of the sheets of material with a supporting plate on each side thereof and showing the adjacent dies in the open position;

Fig. 11 is a side view of the multiple or gang press showing the dies in the closed position;

Fig. 12 is an end view corresponding to the position of the dies shown in Fig. 11; and Fig. 13 is a fragmentary end view of one of the asbestos material sheets with a supporting plate on each side thereof and showing the adjacent dies in the closed position.

Figure 1:
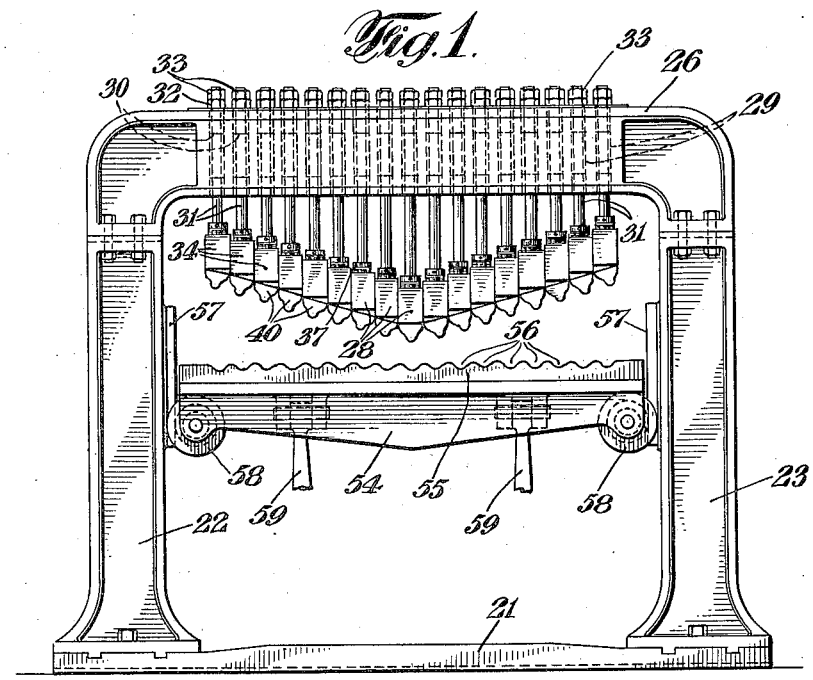
Figure 2:
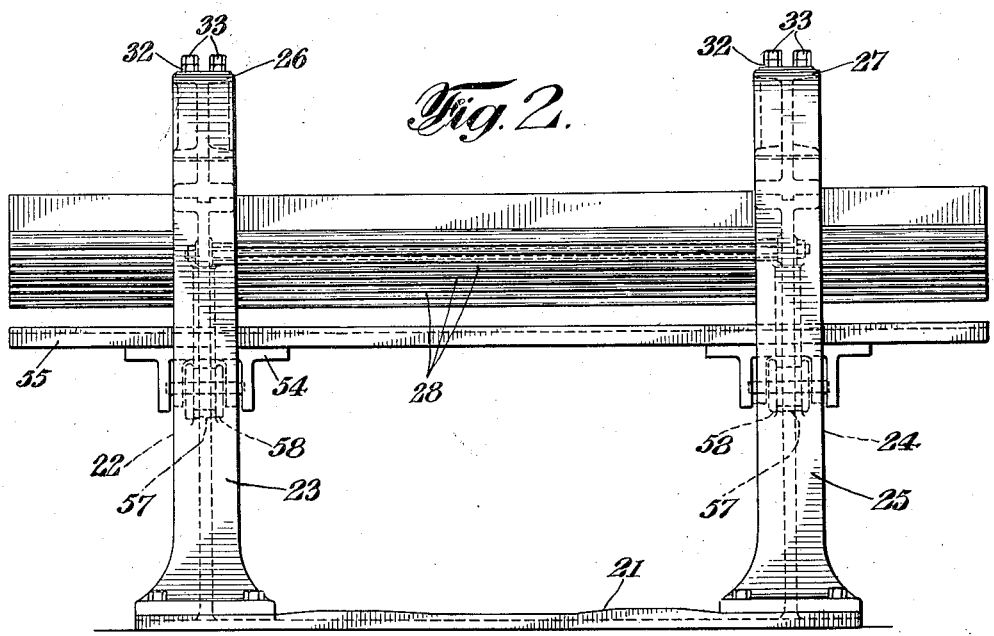
Fig. 2 is a side view of the machine shown in Fig. 1.

Referring to the drawings more in detail the numeral 21 indicates a base from which there extends upwardly standards or columns 22, 23, 24 and 25. The standards 22 and 23 may carry between their upper ends a support 26 and in a similar manner the supports 24 and 25 may carry a support 27. These supports 26 and 27 are adapted to both support and act as guides for a plurality of shape-forming devices indicated generally at 28, 28. The supports may be provided with a plurality of apertures 29 within which are positioned suitable bearing bushings or sleeves 30 adapted to act as guides for longitudinally movable rods 31 which comprise a part of the shape-forming devices 28. The upper ends of the rods 31 are provided with nuts 32 which act as stops against the upper face of either the support 26 or 27 to limit the downward movement of the rods 31. The nuts 32 are held in their adjusted positions by lock nuts 33. Former bars or former blocks 34 are supported from the lower ends of the rods 31, each bar extending under both supports 26 and 27 and having one rod 31 from each support to the bar. Fig. 6 indicates an arrangement for conveniently securing the rod 31 to its former block 34. The lower end of the rod 31 is threaded into the block as indicated at 35. In order to prevent the rod 31 from turning with respect to the former block and thus changing its position therein a suitable locking device may be employed. A flat strip 36 has at one end thereof a collar 37 secured thereto or integral therewith. The rod 31 is adapted to pass through a suitable aperture in the collar 37 and after the rod 31 has been properly adjusted in the former block 34 a set screw 38 locks the strip 36 and the rod 31 together. The other end of the strip 36 may be secured to the former block 34 by means of a screw 39. The distance between the rod 31 and the screw 39 affords considerable leverage and effectually locks the rod 31 against rotation.

It will be noticed from Figs. 1 and 3 that one of the shape-forming devices 28 comes into contact with the material upon which the forming operation is being performed before the other shape-forming devices. This particular forming device may have a forming face integral with or rigidly secured to its former bar 34. The other shape-forming devices are positioned successively higher or farther from the former die to be presently described as they lie farther from the initial or lowest shape-forming device. The lowest shape-forming device is, as shown, positioned in the middle and the others are arranged or distributed substantially equally on both sides thereof in pairs but it is obvious that the lowest one may be at one side and the others extend only on one side thereof.

Each of the shape-forming devices other than the initial one is preferably provided with an auxiliary member 40 which is pivoted to the former bar 34 or hingedly connected therewith to have a limited swinging or oscillatory movement with respect thereto. Referring to Figs. 6 and 7 the member 40 may be provided at each end thereof with an upwardly extending ear 41 having an aperture 42 therein. A complementary recess 43 is provided in the block 34 for the ear 41 and for manufacturing convenience is preferably in a separate block 44 which may be attached to the former block 34 by screws 45. The block 44 is provided with an aperture 46 adapted to be aligned with the aperture 42 in the ears 41 for the reception of a bearing pin 47. The upward movement of the member 40 around the bearing 47 is limited because of the upper face 48 of the member 40 striking against the lower face of the former bar 34. Provision may also be made for limiting the downward swinging movement of the member 40. A link 49 is pivotally connected by means of a screw 50 to the member 40. At the other end of the member 49 a slot 51 is provided through which passes a shouldered screw 52, the screw 52 being threaded into the former bar 34. A wire 53 may be threaded through holes in the heads of the screws 50 and 52 to prevent their turning and working loose.

Suitably positioned beneath the shape-forming devices 28 there may be provided a support 54. Upon the upper portion of this support rests a former die 55 having corrugations 56 complementary to the shape-forming devices or former blocks and adapted to cooperate therewith in the operation of the machine. Suitable guide rails 57 and guide wheels 58 may be provided for the support 54 and movement may be imparted thereto through operating arms 59 by any suitable connections not shown.

In operation a metal corrugated plate 60 which has been oiled to prevent the sticking thereto of the asbestos material is placed on the die 55 and a flat sheet of asbestos material 61 in a more or less plastic state is placed on the plate 60. Suitable mechanism operating through the arms 59 then raises the support 54 and former die 55 until the middle shape-forming device 28 presses the plastic sheet into the corresponding corrugation 56. This position of the apparatus is shown in Fig. 3. It will be noticed that in this position the two members 40 of the former blocks which are adjacent to the middle block are just touching the asbestos. A further upward movement of the support 55 first presses the asbestos against these two members 40 sufficiently to swing them against the force of gravity around their pivotal connections 47. The ends of the members 40 therefore have a movement which is largely horizontal and toward the previously formed corrugation at the middle of the sheet. At the same time the upward movement of the asbestos sheet with its support contributes a relative movement between the sheet 61 and the members 40 which is chiefly vertical.

The combined result of these two movements is that each former member 40 moves from a position which is outside of the corrugation and away from the center thereof to a position which is inside of the corrugation and centrally thereof as indicated in Fig. 4. The important feature of this compound movement is that a sufficient amount of the asbestos sheet is drawn from the outside to provide sufficient material to extend throughout the curvature of the corrugations without the necessity of stretching or tearing the sheet which would take place if the former block members 40 were pressed directly into the corrugations without having available any additional material. After the first three corrugations are completed the next two shape-forming devices 28 become operative and so on until all have produced their corresponding corrugations. It will be noticed that the weight of each former block member 40 is considerably less than the weight of the entire shape-forming device 28. During the initial pressing operation, when the asbestos sheet is being given the shape or contour of the corrugation, the sheet itself is receiving an impress due only to the weight of the member 40. Thereafter, the material being firmly positioned in the corrugation and there being much less danger of tearing as the operation is principally a pressing one, the pressure exerted is greater, due to the fact that the entire shape-forming device 28 is much heavier than the member 40 alone. When the shape-forming devices 28 have been raised to their highest positions as shown in Fig. 4 there is still a clearance between them and the under side of the support 26, so that at no time does the sheet that is being corrugated receive a greater pressure than that due to the weight of the shape-forming devices 28. The support 55 is then lowered and the corrugated plate 60 and sheet 61 removed, and a second oiled corrugated plate 62 placed on top thereof preparatory to the next succeeding operation in apparatus now to be described.

The pressing machine shown in Fig. 8 may have standards or columns 63 extending upwardly from a base, not shown, and may carry at their upper ends an upper support 64. An upper die 65 having corrugations on the lower side thereof as indicated at 66 is firmly secured to the support 64 by means of bolts 67. The die 65 is in the general form of a rectangular plate and may have extending laterally therefrom a plurality of supporting and guiding pins 68. Positioned immediately below the plate or die 65 is another die 69 having corrugations on the upper surface thereof as indicated at 70 and also corrugations on the under surface as indicated at 71. Secured to or integral with the die 69 are a plurality of upwardly extending ears 72. Each ear 72 may be provided with an elongated aperture or slot 73 into which extends the corresponding pin 68 of the die positioned thereabove. In the construction shown in the drawings each die except the bottom one is provided with six pins 68, three on one side and three on the other side. In a similar manner each die except the top one is provided with six upwardly extending ears 72, three on one side of the die and three on the other side. In Fig. 8 each die is shown as suspended from the die above and supported by the co-operating ears and pins. In this suspended position the die 69 is a sufficient distance from the die 65 so that the intervening space 74 is somewhat greater than the combined thickness of each pair of plates 60 and 62 and the interposed formed corrugated sheet 61. The bottom die indicated by the reference character 75 may be positioned on top of a hydraulic plunger 76.

In operation, the spaces between the adjacent dies are first all filled, each one with a sandwich, so to speak, constituted by a pair of the plates 60 and 62 with their interposed sheet 61 (Fig. 8). Then the hydraulic plunger 76 is moved upward and the dies and sandwiched sheets are forced together under considerable pressure, 2,000 lbs. per square inch having been satisfactorily used for this purpose. This pressure compresses the sheets into a firm homogeneous structure. The relative position of the parts after the hydraulic plunger 76 has moved the dies together is shown in Figs. 11 and 12 and the appearance of one of the sheets of asbesto material with its corrugated adjacent plates is shown in Fig. 13. It will be noticed that the arrangement for superposing the sheets one above the other utilizes the same pressure for all sixteen sheets. The economy achieved, whether measured by the fact that the pressure required for pressing one sheet is utilized for pressing all sixteen sheets, or whether it is measured by the fact that the time required for operating the press and pressing one sheet is substantially the same time that is required for operating the press and compressing all sixteen sheets, is very great.

It will be observed that by the present invention there is constituted a method of producing corrugated sheets which consists in applying a flat sheet to a corrugated support, the support carrying the sheet being passed through a corrugating machine to form corrugations in the sheet, thereafter withdrawing the support and the corrugated sheet from the machine, inserting the supported corrugated sheet in a die device and compressing the corrugated sheet therein; and that the method preferably is followed of forming the sheets one by one with corrugations, and then compressing a considerable number of these formed or corrugated sheets at one operation.

It will also be noted that by the invention there is provided means for corrugating sheets of plastic material which comprises a corrugated support for the unformed sheet and devices cooperating first with the middle of the support to form substantially the middle portion of the sheet with a corrugation, and thereafter successively forming the corrugations in pairs at opposite sides of the middle corrugation, the material of the sheet being drawn inward from the sides into the pairs of corrugations, pair by pair.

It is further to be noted that there is provided a multiple pressing means or gang press which comprises in combination a set of loosely hung dies and means for successively moving them to operative position, the dies falling apart of their own weight when the pressure is withdrawn; that the dies are arranged in a set disposed substantially one directly above the other, each die being supported by the one above it in such a way that free movements of the dies towards and away from each other are afforded, the movements of one die being independent of movement by the others.

Various changes may be made without departing from the spirit and scope of the invention.

I claim:

1. The method of producing corrugated sheets which consists in applying a flat sheet to a corrugated support, passing the support carrying the sheet through a corrugating machine to form the corrugations in the sheet, withdrawing the support and the corrugated sheet from the machine, inserting the support and corrugated sheet in a die device and compressing the corrugated sheet therein.

2. The method of producing corrugated sheets which consists in applying flat sheets in more or less plastic condition to corrugated supports, passing the supports carrying the sheets, one by one, through a corrugating machine to form corrugations in the sheets, entering a plurality of corrugated supports with the formed sheets thereon in a pressure device, and simultaneously compressing the plurality of corrugated sheets therein.

3. The method of producing corrugated sheets which consists in applying flat sheets to corrugated supports, passing the supports carrying the sheets, one by one, through a corrugating machine to form corrugations in the sheets, entering a plurality of corrugated supports with the formed sheets in a pressure device, and simultaneously compressing the plurality of corrugated sheets therein, the supports and sheets being so positioned that the total force of the pressure device is applied to each sheet.

4. The method of producing parallel corrugations in a flat sheet of plastic material comprising pressing an initial corrugation into the sheet with a force acting at right angles to the plane of the sheet and successively pressing each subsequent corrugation with a movement that is partly in a direction at right angles to the plane of the sheet and partly transverse thereto.

5. In a machine for corrugating sheets of plastic material, the combination of a corrugated support, and means cooperating first with the middle of said support to form substantially the middle of the sheet with a corrugation and thence successively outward in pairs the corrugations at the opposite sides of the middle corrugation, the material being drawn inward from the sides into the pairs of corrugations.

6. The method of producing parallel corrugations in a flat sheet of plastic material comprising pressing an initial corrugation into the sheet with a force acting at right angles to the plane of the sheet, simultaneously pressing two more corrugations, one at each side of the first corrugation, each with a movement that is partly in a direction at right angles to the plane of the sheet and partly toward the previously formed corrugations, forming two more corrugations simultaneously in the same manner and so on until the desired number of corrugations have been formed.

7. The method of producing corrugations in a flat sheet of plastic material comprising pressing each adjacent corrugation successively, first with a moderate force and a movement that is partly at right angles to the plane of the sheet and partly toward the previously formed corrugation, and then with a greater force that is substantially at right angles to the plane of the sheet.

8. In a machine for forming a sheet of plastic material to a desired shape, the combination of a support for the sheet, and a plurality of shape-forming devices, said devices as a whole and said support being relatively movable towards and away from each other to suitably cooperate with the sheet, and said devices being mounted for separate movements independently of each other.

9. In a machine for forming a sheet of plastic material to a desired shape, the combination with a support, the operating face of which conforms to the desired shape and on which the sheet is received, a second support, and a plurality of shape-forming devices mounted thereon, the two supports being relatively movable towards and away from each other to enable said devices to coact with the sheet, said devices being mounted on said second support independently of each other.

10. In a machine for corrugating sheets of plastic material, the combination of a corrugated support and a series of forming members mounted for limited movement transverse of the corrugations in said support.

11. In a machine for corrugating sheets of plastic material, the combination of a corrugated support and a series of forming bars mounted for limited movement transverse of the corrugations in said support and also for movements in parallelism with each other.

12. In a machine for corrugating sheets of plastic material, the combination of a corrugated support and a set of forming bars corresponding with the corrugations in said support, each forming bar being provided with a swinging head.

13. In a machine for corrugating sheets of plastic material, the combination of a corrugated support and a set of parallel forming bars corresponding with the corrugations in said support, each forming bar being provided with a pivotally controlled head.

14. In a machine for corrugating sheets of plastic material, the combination of a corrugated support and a series of forming bars mounted for limited movement transverse of the corrugations in said support, the bottoms of the corrugations in said support being contained in a single plane, and the coacting ends of the forming bars being contained in two planes angularly disposed, the apex of the angle being at about the middle point of the support.

15. In a machine for corrugating sheets of plastic material, the combination of a corrugated support and a set of parallel forming bars corresponding with the corrugations in said support, each forming bar being provided with a swinging head, the central swinging head first coming into operation and the other heads being so disposed as to coact successively at opposite sides of the middle bar with the corrugated support.

16. In a machine for corrugating sheets of plastic material, the combination of a corrugated support and a set of parallel forming bars corresponding with the corrugations in said support, each forming bar being provided with a swinging head, said swinging heads being adapted for sliding movements and also for swinging movements at angles to said sliding movements.

17. A machine for forming corrugations in a sheet of plastic material comprising a support for said sheet, a plurality of shape forming devices mounted for separate independent movement in a direction perpendicular to said sheet, and means for moving said support and said devices toward each other, the device for each successive adjacent corrugation being so positioned that it comes into contact with said sheet after the preceding adjacent device.

18. A machine for forming corrugations in a sheet of plastic material comprising a support for said sheet, a plurality of shape-forming devices mounted for separate independent movement in a direction perpendicular to said sheet, a member mounted on each device for limited movement transverse of said sheet, and means for moving said support and said devices toward each other, the member for each successive adjacent corrugation being adapted to come into contact with said sheet after the preceding adjacent member and after the preceding member has substantially completed its limited transverse movement.

19. In a machine for forming a sheet of plastic material to a desired shape, the combination with a support the operating face of which conforms to the desired shape and at which the sheet is received, and a plurality of shape forming devices mounted on a second support, the two supports being movable toward each other to enable said devices to coact with the sheet, said devices being mounted for independent movements on the second support in a direction perpendicular to said sheet, and members for said devices adapted for a limited movement transverse of said sheet.

20. In a gang press, the combination of a set of loosely hung dies, and means for successively moving them to operative position.

21. In a gang press, the combination of a set of loosely hung dies, and means for successively moving them to operative position, the dies falling apart of their own weight when said means becomes inoperative.

22. In a gang press, the combination of a set of dies arranged in parallelism one above the other, and means for supporting each of the dies by the one above it.

23. In a gang press, the combination of a set of dies arranged in parallelism one above the other, and means for supporting each of the dies by the one above it, said means comprising devices for affording free movements of the dies towards and away from each other, the movement of one die being independent of movement by the others.

24. In a multiple pressing machine, a plurality of plates of substantially the same size, said plates being positioned vertically one above the other, ears extending upwardly from the edges of said plates and having vertical slots therein, pins extending laterally from said plates for engaging the slots in the upwardly extending ears of the plate beneath for supporting said plate, the length of the slots being such as to permit adjacent plates to move apart sufficiently for the insertion of material to be pressed therebetween and to permit the plates to move together sufficiently to press said material.

FRED W. BARTH.